(12) United States Patent
Ocalan

(10) Patent No.: US 7,373,972 B2
(45) Date of Patent: May 20, 2008

(54) PILOTING ACTUATOR VALVE FOR SUBTERRANEAN FLOW CONTROL

(76) Inventor: Murat Ocalan, 3202 Norfolk Apt. 13306, Houston, TX (US) 77098

( * ) Notice: Subject to any disclaimer, the term of this patent is extended or adjusted under 35 U.S.C. 154(b) by 295 days.

(21) Appl. No.: 10/906,083

(22) Filed: Feb. 2, 2005

(65) Prior Publication Data
US 2006/0043683 A1  Mar. 2, 2006

Related U.S. Application Data

(60) Provisional application No. 60/605,562, filed on Aug. 30, 2004.

(51) Int. Cl.
*E21B 34/16* (2006.01)
(52) U.S. Cl. .................. 166/66.7; 166/332.1
(58) Field of Classification Search .......... 166/372, 166/374, 386, 66.6, 320, 321, 324, 332.7, 166/332.1, 322, 319; 137/155; 417/113
See application file for complete search history.

(56) References Cited

U.S. PATENT DOCUMENTS

| | | | | |
|---|---|---|---|---|
| 2,385,316 A | * | 9/1945 | Walton | 417/113 |
| 2,446,680 A | * | 8/1948 | Walton | 417/113 |
| 2,573,110 A | * | 10/1951 | Robison | 137/155 |
| 2,642,811 A | * | 6/1953 | Fletcher | 417/113 |
| 2,642,812 A | * | 6/1953 | Robinson | 417/113 |
| 2,658,460 A | * | 11/1953 | Davis | 417/113 |
| 2,880,620 A | | 4/1959 | Bredtschneider | |
| 2,994,335 A | * | 8/1961 | Dudley | 137/155 |
| 3,086,593 A | * | 4/1963 | Chitwood | 166/319 |
| 3,213,806 A | * | 10/1965 | Walton | 417/112 |
| 3,224,459 A | * | 12/1965 | Lilly | 137/155 |
| 3,225,783 A | * | 12/1965 | Stacha | 137/155 |
| 3,311,127 A | * | 3/1967 | Dudley | 137/155 |
| 3,722,527 A | * | 3/1973 | Blackwell | 137/155 |
| 3,735,774 A | * | 5/1973 | Chenoweth | 137/155 |
| 4,667,736 A | * | 5/1987 | Rumbaugh et al. | 166/66.6 |
| 5,066,198 A | * | 11/1991 | Decker | 417/54 |
| 5,069,242 A | * | 12/1991 | Kilgore | 137/155 |
| 5,474,303 A | | 12/1995 | Coles | |
| 5,535,828 A | * | 7/1996 | der Kinderen et al. | 166/372 |
| 5,630,444 A | | 5/1997 | Callaghan et al. | |
| 5,662,335 A | | 9/1997 | Larsen | |
| 6,932,581 B2 | * | 8/2005 | Messick | 417/54 |

FOREIGN PATENT DOCUMENTS

| | | |
|---|---|---|
| GB | 1577828 | 10/1980 |
| GB | 2244737 A | 12/1991 |
| GB | 2252116 A | 7/1992 |
| GB | 2413170 A | 10/2005 |

* cited by examiner

*Primary Examiner*—Jennifer H Gay
*Assistant Examiner*—David Andrews
(74) *Attorney, Agent, or Firm*—Robert A. Van Someren; Kevin B. McGoff; Bryan P. Galloway

(57) ABSTRACT

A piloting actuator valve controls flow in a well. The piloting actuator valve is combined with a downhole completion and utilizes a pilot valve to control actuation of a main valve. A controllable actuator is coupled to the pilot valve and enables selective control over the pilot valve which, in turn, controls the state of the main valve.

19 Claims, 2 Drawing Sheets

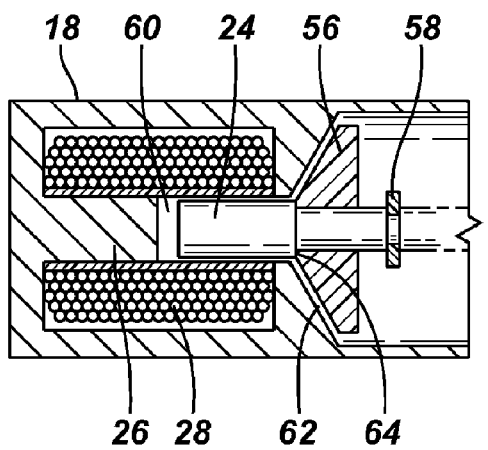
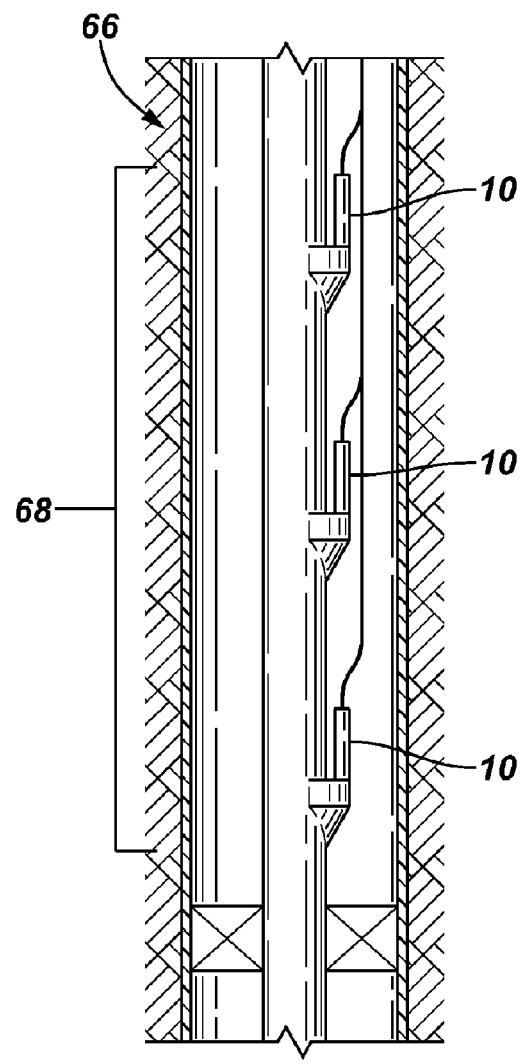

PILOTING ACTUATOR VALVE FOR SUBTERRANEAN FLOW CONTROL

This application claims the benefit of U.S. Provisional Application 60/605,562 filed on Aug. 30, 2004.

BACKGROUND OF THE INVENTION

1. Field of Invention

The present invention pertains to pilot valves used in downhole completions, and particularly to a pilot valve using an actuator to control the state of the pilot valve, and thereby the state of the main valve.

2. Related Art

Pilot valves are used in gas lift product lines such as intermittent gas lift applications. Existing pilot valves are typically driven by a bellows operating in response to a pressure differential, similar to what is used in other types of gas lift valves. Although the present invention can be used for intermittent gas lift, it is not limited to that application.

Actuator valves such as solenoid valves, for example, are used in various industrial and downhole applications. Because of the linear relationship between the port size and solenoid force requirement, pilot valves have been used in many solenoid-actuated valves to maximize pressure ratings. In many existing downhole tool designs, two bellows are used to seal and isolate reservoir fluids from the fluid in the interior of the solenoid. In addition, the two-bellows configuration allows the pressure to balance between those fluids. The most intuitive way of configuring two bellows is to have two separate bellows; one for sealing and the other for pressure balancing. However, because of space constraints, it may be more advantageous to achieve both functions using only one fluid contact surface. In U.S. Pat. No. 2,880,620, Bredtschneider describes a system having two telescoping bellows for this purpose. In U.S. Pat. No. 5,662,335, Larsen describes a system that achieves the same purpose by assembling two bellows in an end-to-end arrangement.

SUMMARY

The present invention provides for a pilot valve used in a well and in which the state of the pilot valve is controlled by an actuator.

Advantages and other features of the invention will become apparent from the following description, drawings, and claims.

BRIEF DESCRIPTION OF DRAWINGS

FIG. 3 is a schematic view of an embodiment of a solenoid used in the piloting actuator valve of FIG. 1.

FIG. 4 is a schematic view showing a cluster of piloting actuator valves being used in a well.

DETAILED DESCRIPTION

Figure 1:
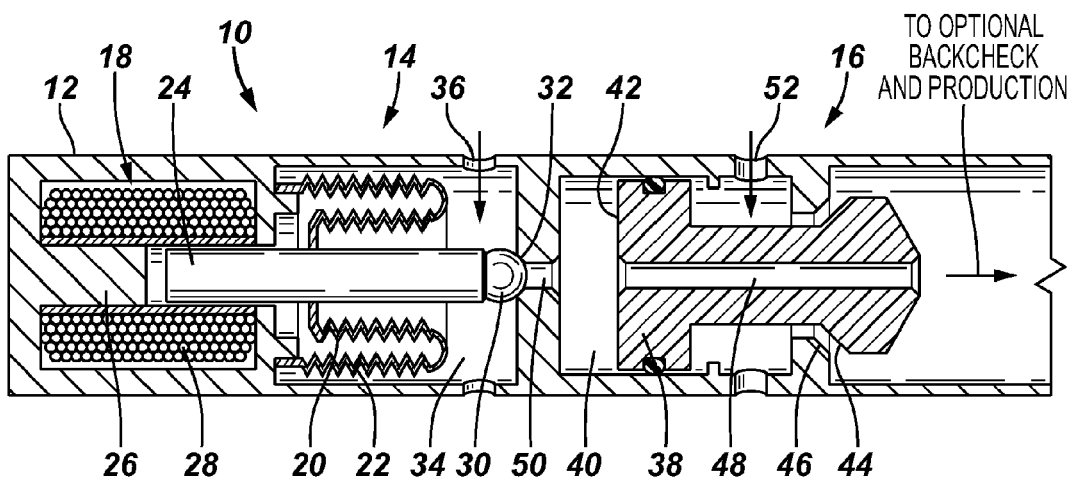
FIG. 1 shows a schematic view of a piloting actuator valve constructed in accordance with the present invention.

FIG. 1 shows a piloting actuator valve 10 having a housing 12 enclosing a pilot valve 14 and a main valve 16. Pilot valve 14 comprises an actuator 18, bellows 20, 22, and a plunger 24. Actuator 18 can be one of various mechanical or electromechanical devices. For example, actuator 18 may be a solenoid, a piezoelectric device, a shape-memory alloy, a linear motor, or a conventional electric motor. In the embodiment of FIG. 1, and in the discussion below, a solenoid is described as the actuating member. However, the above alternatives may readily be adapted to replace the solenoid and serve as the actuating member.

Referring to FIG. 1, solenoid 18 comprises a core 26 and windings 28 wrapped on core 26. Windings 28 at least partially circumferentially enclose one end of plunger 24. The opposite end of plunger 24 has a sealing surface 30 that mates with a pilot seat 32. Bellows 20, 22 mount to housing 12 inside a cavity 34 in housing 12 and to plunger 24, at least partially circumferentially enclosing plunger 24. Plunger 24 extends into cavity 34. A pilot injection port 36 allows fluid communication between cavity 34 and the exterior of housing 12. The exterior of housing 12 is subjected to fluids upstream of piloting actuator valve 10.

In the embodiment of the FIG. 1, bellows 20, 22 are disposed in housing 12 in a telescoping arrangement. Bellows 20, 22 provide a seal between the downhole fluids and actuator 18. Bellows 20, 22 also provide pressure balancing between the fluids in the interior of actuator 18 and the downhole fluids in contact with bellows 20, 22. In addition, the spring force of bellows 20, 22 may be used as a return mechanism of plunger 24. An optional spring or springs (not shown) may also be used to provide this force.

Figure 2:
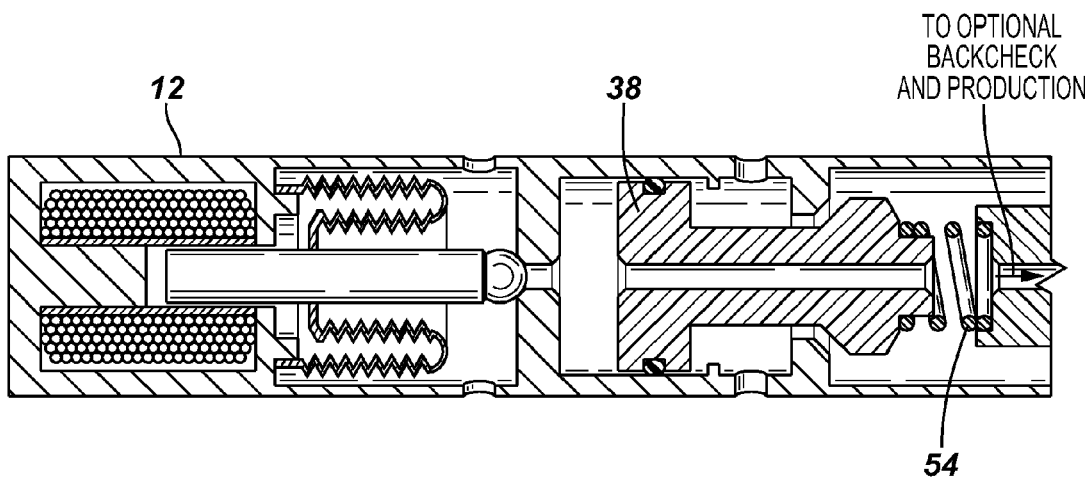
FIG. 2 is a schematic view of the piloting actuator valve of FIG. 1 showing a spring disposed in the main valve.

Main valve 16 comprises a piston 38 disposed in a main chamber 40 within housing 12. Piston 38 has a piston head 42 on one end that divides main chamber 40 into first and second sides. Piston head 42 is in sliding, sealing contact with the walls of main chamber 40. On the end of piston 38 opposite piston head 42 is a main seal 44. Main seal 44 seals against a main seat 46 when main valve 16 is closed. Piston 38 has a piston passageway 48 that allows fluid communication between the first side of main chamber 40 and the downstream side of main valve 16 (typically production tubing). A pilot passageway 50 allows fluid communication between cavity 34 and the first side of main chamber 40 when sealing surface 30 is not engaged with pilot seat 32. A main injection port 52 allows fluid communication between the second side of main chamber 40 and the exterior of housing 12 (typically the well annulus). An optional spring 54 (FIG. 2) may be used to improve functional characteristics of main valve 16.

In the embodiment shown in FIG. 3, solenoid 18 has a plunger ring 56 and a retainer ring 58. Plunger ring 56 slides on plunger 24 but its movement is limited by retainer ring 58. Electrical current passing through windings 28 produces magnetic forces on plunger 24 and plunger ring 56 that, in this embodiment, tend to pull plunger 24 into an upper gap 60 while pulling plunger ring 56 into a lower gap 62. The force on plunger ring 56 is initially transferred to plunger 24 via shoulder 64. Because upper gap 60 is larger than lower gap 62, as plunger 24 travels into and narrows upper gap 60, lower gap 62 narrows and then closes. As plunger 24 continues moving to further narrow upper gap 60, plunger ring 56 slides on plunger 24 until upper gap 60 closes completely. Because the magnetic force is inversely proportional to the width of the gap, the force created at lower gap 62 contributes significantly because of the smaller gap distance. Furthermore, this increase in force at the original position of plunger 24 is not achieved by sacrificing travel because the larger upper gap is the total intended travel of plunger 24.

There are various operational states for piloting actuator valve 10, including permutations of pilot valve 14 being open or closed and injection fluid pressure being greater or less than production fluid pressure.

In operations in which solenoid 18 is energized, core 26 is magnetically energized by windings 28. In the arrangement shown, the magnetic field exerts a pulling force on plunger 24. Solenoid 18 opens pilot valve 14 by pulling sealing surface 30 from sealing engagement with pilot seat 32. Alternative actuator mechanism would similarly control the state of pilot valve 13.

If injection fluid pressure exceeds production fluid pressure while pilot valve 13 is open, the net force on piston 38 drives piston 38 such that main valve 16 is held in its open state, and injection fluid flows downhole. That occurs because fluid pressure entering through pilot injection port 36 passes through pilot passageway 50 and bears on piston head 42. Fluid flow is choked in piston passageway 48. Therefore, the pressure of the fluid drops from injection pressure at one end of piston passageway 48 to production pressure at the other end. Since the injection fluid pressure is greater than the production fluid pressure bearing on the opposite end of piston 38, main seal 44 is driven off of main seat 46. Injection fluid entering through main injection port 52 flows through open main valve 16.

If production fluid pressure exceeds injection fluid pressure while pilot valve 14 is open, piston 38 is similarly driven such that main valve 16 is held in its open state. That is because the higher pressure production fluid passes through piston passageway 48 in to the first side of main chamber 40, through pilot passageway 50 into pilot chamber 34, and out pilot injection port 36. However, the flow restrictions represented by those various passageways and ports allow pressure in first side of main chamber 40 to build up to nearly that of the production fluid pressure, and that pressure bears on one end of piston head 42. Pressure in the second side of main chamber 40 is the lower injection fluid pressure, and that bears on the other end of piston head 42. Thus, the forces on piston 38 are not balanced and main valve 16 is held open.

What is claimed is:

1. A piloting actuator valve for use in a well comprising:
   a housing having a pilot injection port and a main injection port;
   a pilot valve having an actuator disposed in a pilot chamber within the housing, the actuator being controllable to actuate the pilot valve independently of differential pressure acting on the pilot valve, the pilot injection port allowing fluid communication with the pilot chamber;
   a main valve disposed in a main chamber within the housing, the main injection port allowing fluid communication with the main chamber; and
   a pilot passageway to allow fluid communication between the pilot chamber and the main chamber.

2. The piloting actuator valve of claim 1 in which the pilot valve further comprises:
   a plunger moveably mounted to the actuator and having a sealing surface at one end to seal the pilot passageway from the pilot chamber; and
   a bellows assembly sealingly mounted to the actuator or housing and to the plunger.

3. The piloting actuator valve of claim 2 in which the bellows assembly provides for pressure equalization between the pilot chamber and the interior of the actuator.

4. The piloting actuator valve of claim 2 in which the bellows assembly provides a spring force to the plunger.

5. The piloting actuator valve of claim 1 further comprising a pilot seat at one end of the pilot passageway.

6. The piloting actuator valve of claim 1 in which the main valve comprises a piston having a piston head, a main seal, and a piston passageway through the piston.

7. The piloting actuator valve of claim 6 in which the piston head is in sealing contact with the walls of the main chamber such that the main chamber is partitioned into first and second subchambers.

8. The piloting actuator valve of claim 7 in which the main injection port allows fluid communication with the second subchamber.

9. The piloting actuator valve of claim 6 further comprising a spring to apply a force on the piston.

10. The piloting actuator valve of claim 1 in which the actuator comprises a plunger having a plunger ring carried on the plunger.

11. The piloting actuator valve of claim 10 in which the plunger has a shoulder on which the plunger ring bears.

12. The piloting actuator valve of claim 10 in which the plunger ring completes its travel before the plunger completes its travel.

13. The piloting actuator valve of claim 10 in which the plunger ring, upon completion of its travel, slides on the plunger as the plunger completes its travel.

14. The piloting actuator valve of claim 10 in which the actuator further comprises a retainer ring mounted on the plunger.

15. The piloting actuator valve of claim 1 in which the actuator is a solenoid.

16. A solenoid system for use in a downhole tool comprising:
    a housing;
    a core disposed within the housing;
    a plunger moveably mounted within the housing;
    windings wrapped around at least a portion of the core and at least a portion of the plunger; and
    a plunger ring carried on the plunger, the plunger ring being acted on by magnetic forces when electrical current is passed through the windings to facilitate movement of the plunger.

17. The solenoid of claim 16 further comprising a retainer ring mounted on the plunger.

18. The solenoid of claim 16 in which the plunger ring is adapted to bear on a shoulder of the plunger.

19. The solenoid of claim 16 in which the travel of the plunger is greater than the travel of the plunger ring.

* * * * *